July 10, 1962  D. H. SCHLUETER ET AL  3,043,629
TRUCK BOX TILTING MECHANISM
Filed Dec. 14, 1960  3 Sheets-Sheet 1
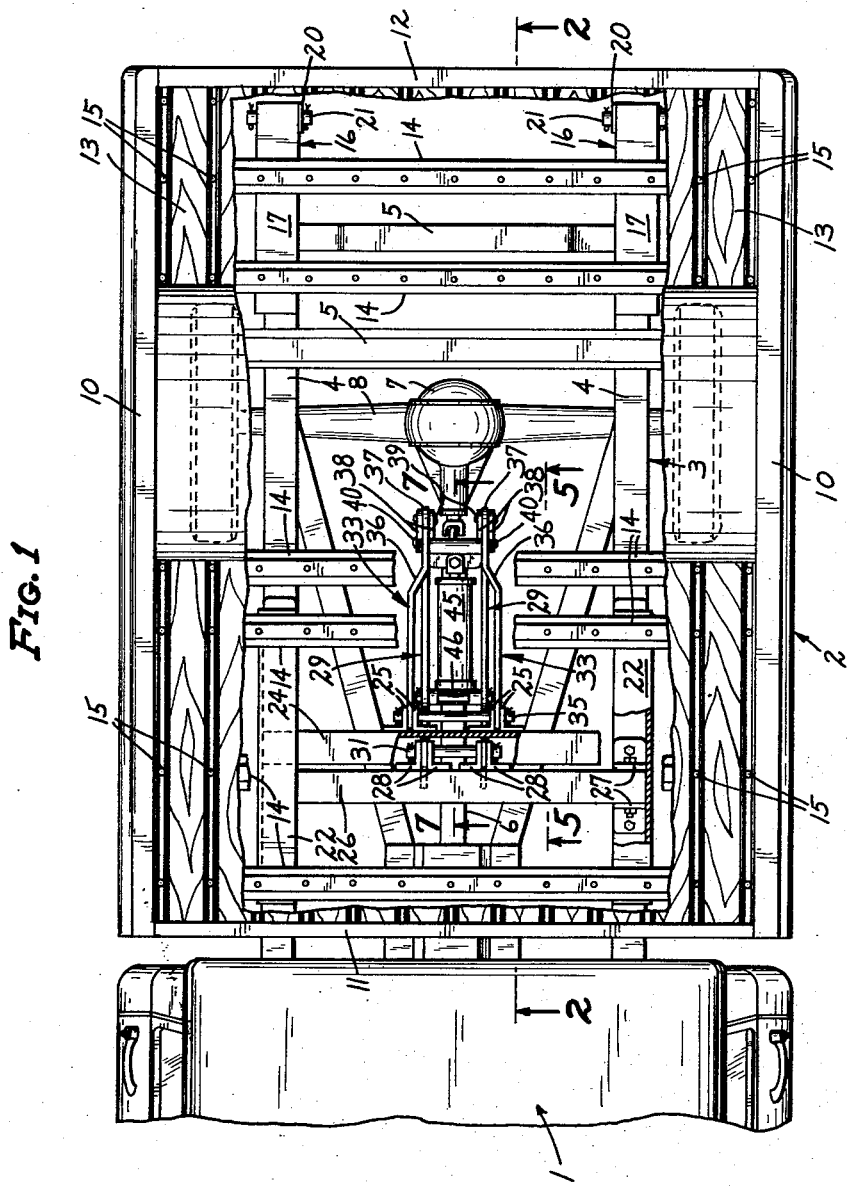
INVENTORS.
DENNIS H. SCHLUETER
EDWARD H. SCHLUETER
BY
Merchant & Merchant
ATTORNEYS

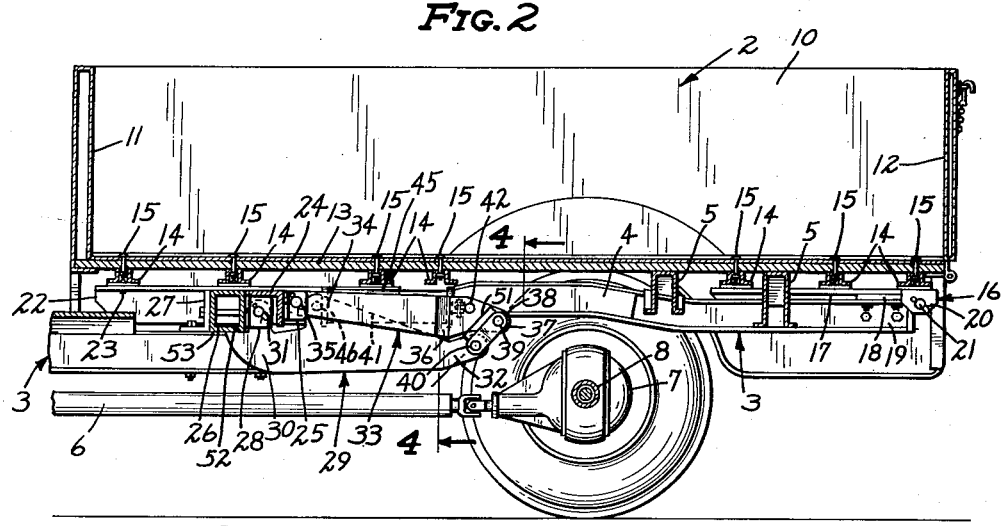
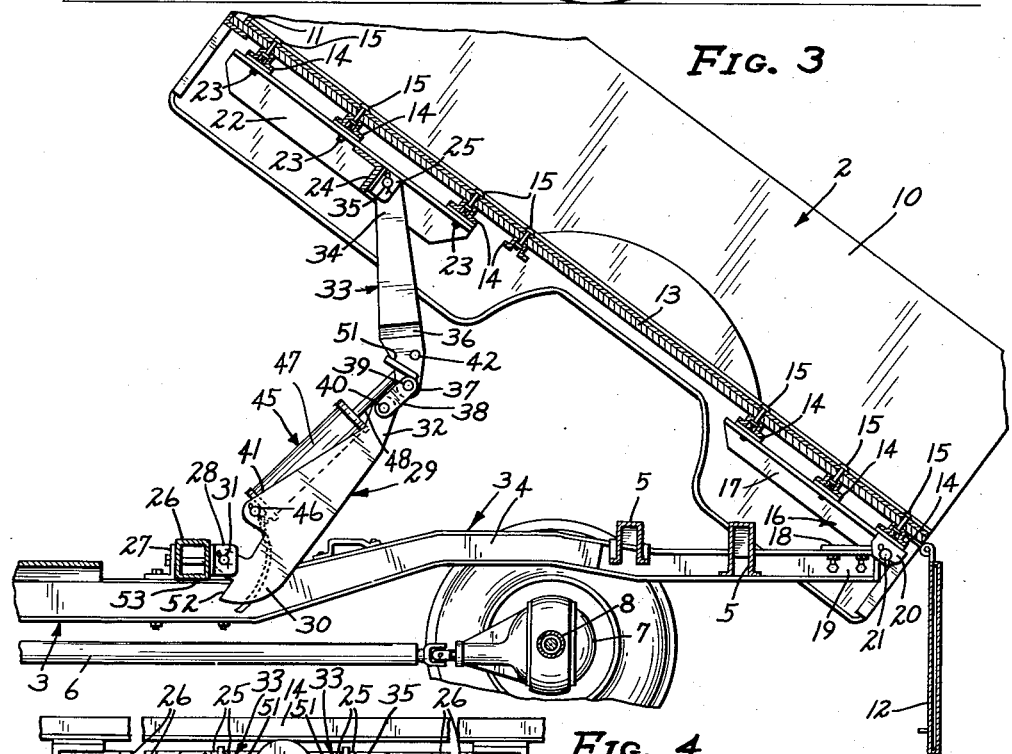

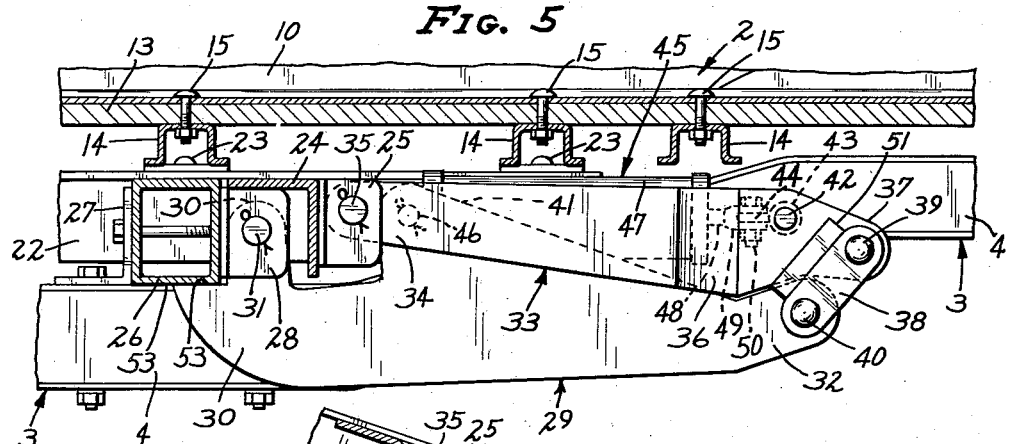
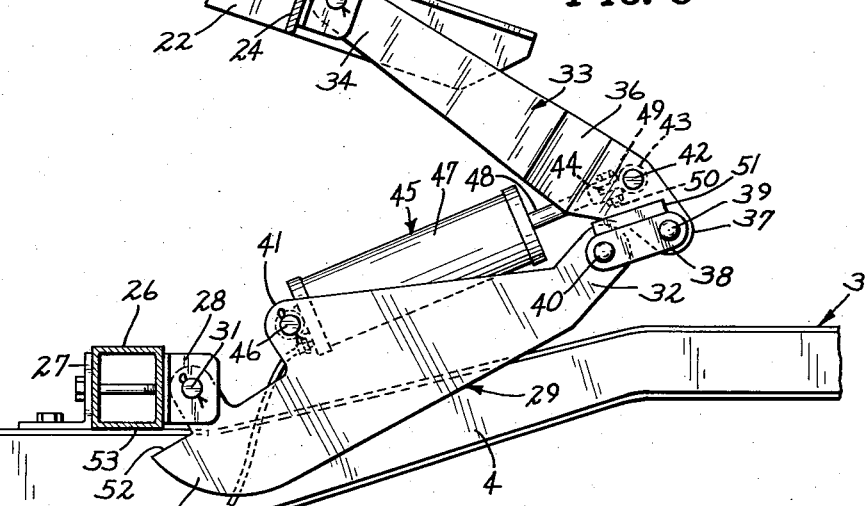
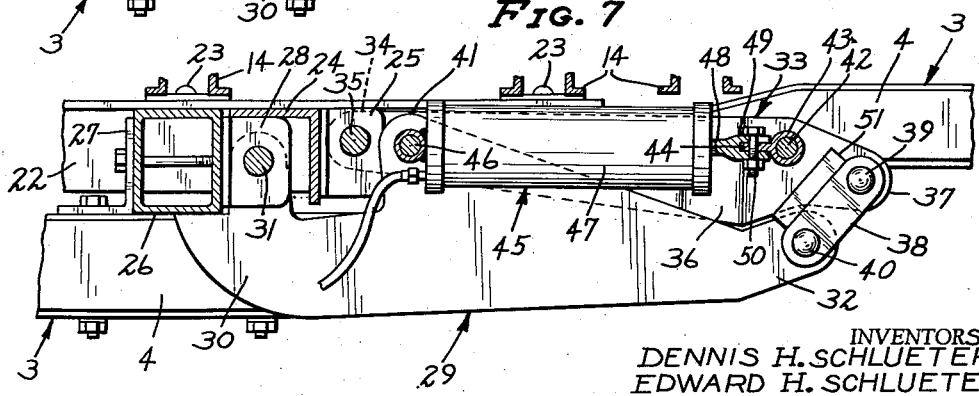

United States Patent Office 3,043,629
Patented July 10, 1962

3,043,629
TRUCK BOX TILTING MECHANISM
Dennis H. Schlueter and Edward H. Schlueter, Lehr, N. Dak., assignors to Lehr Manufacturing Corporation, Lehr, N. Dak., a corporation of North Dakota
Filed Dec. 14, 1960, Ser. No. 75,792
4 Claims. (Cl. 298—22)

This invention relates generally to hoisting and lifting machinery and equipment, and more particularly it relates to a truck box tilting mechanism for use intermediate the chassis and the box frame of a truck.

An important object of this invention is the provision of a truck box tilting mechanism which is designed and constructed so that the same may be easily installed intermediate the chassis and box frame of a truck without materially altering the spacing therebetween. This object of our invention solves one of the major problems normally characteristic of previous types of truck box tilting or hoisting mechanisms in that the installation of such previously known units have either required a great amount of costly alteration to the truck chassis and frame or else materially altered the spacing between the chassis and the box frame of the truck, the latter obviously being undesirable.

Another object of this invention is the provision of a truck box tilting mechanism which is designed and constructed so as to permit great flexibility of change in the position in which the mechanism may be mounted on the truck chassis, the invention being particularly versatile concerning its mounting with respect to the longitudinal axis of the truck upon which it may be desired to mount the same.

Another object of this invention is the provision of a truck box tilting mechanism in which the various parts or elements thereof are so arranged so as to permit a maximum amount of efficiency in the utilization of the lifting forces throughout the complete range of the lifing cycle.

A further object of this invention is the provision of a truck box tilting mechanism which is designed and constructed so that the same in its normal mounted position will straddle the normally obstructing drive shaft of the truck whereby to permit a minimum amount of alteration of the spacing between the truck chassis and the box frame thereof.

Another object of this invention is the provision of a truck box tilting mechanism in which the installation thereof does not necessitate the removal of any of the original parts or items of the truck structure.

A still further object of this invention is the provision of a truck box tilting mechanism which may be conveniently installed on virtually any type of truck without regard to the particular configuration of the frame or chassis thereof.

Other objects of this invention reside in the provision of a truck box tilting mechanism which is extremely economical to manufacture and install, which is strong and durable in construction, which requires little or no maintenance, and which is highly efficient in sustaining its purposes.

The foregoing and other objects and advantages of this invention will become apparent from the following detailed specification, appended claims and attached drawings.

Referring to the drawings, wherein like reference characters indicate like parts or elements throughout the several views:

FIG. 1 is a view in top plan of our invention showing the same installed on a truck, some parts being broken away and some parts shown in section;

FIG. 2 is a view in vertical section taken on the line 2—2 of FIG. 1;

FIG. 3 is a view similar to FIG. 2, but showing our invention in its maximum extended position, some parts being broken away;

FIG. 4 is a view in vertical section taken on the line 4—4 of FIG. 2;

FIG. 5 is an enlarged view taken on the line 5—5 of FIG. 1, some parts being broken away;

FIG. 6 is a view similar to FIG. 5, but showing our invention in an intermediate position, some parts being broken away; and FIG. 7 is an enlarged view taken on the line 7—7 of FIG. 1, some parts being broken away.

Referring to the drawings, and particularly FIG. 1 thereof, a truck is shown, the same including a cab 1, a hauling bed or box, represented generally by the reference numeral 2, and a truck chassis, represented in general by the reference numeral 3. The chassis 3 includes longitudinal frame members 4, transverse frame members 5, an upwardly and downwardly swinging rotary drive shaft 6, a differential 7, a rear axle 8, and X-frame members 9. The hauling box 2 comprises side walls 10, a front wall 11, an end gate 12, and a floor 13 which is supported by transverse floor joists 14 which are secured to the floor 13 by means of the bolts 15. It is noted that the drive shaft 6 of the truck is equipped in the conventional manner with universal joints and is connected at its rearward end to the differential 7 of the suspended rear axle 8 of the truck whereby the driving rotation of the drive shaft 6 is not hindered by the normal bouncing of the rear wheels and axle 8.

For the purpose of providing a pivotal connection between the chassis 3 and the box 2 of the truck, a pair of hinge units, represented in general by the reference numeral 16, are disposed adjacent the rear of the truck. Each of the hinge units 16 comprises an upper elongated leaf member 17 which is removably secured to the truck box 2, and a lower leaf member 18 which is removably secured to the rear end 19 of the longitudinal frame member 4 of the chassis 3. Each of the hinge units 16 defines a pair of journal flanges 20, which are adapted to receive corresponding pintle shafts 21 so as to form the beforesaid pivotal connection. It is noted that the upper elongated leaf members 17 of the hinge units 16 are secured to the transverse floor joists 14 of the box 2 so as to permit longitudinal adjustment thereof whereby to vary the disposition of the truck box 2.

A pair of longitudinally extending transversely spaced elongated upper angle supports 22 are rigidly but removably secured to the floor joists 14 of the truck box 2 near the forward end thereof by means of the bolts 23. Interposed between the upper angle supports 22 and rigidly secured thereto, as by welding, is an upper support member 24, the same also preferably being formed from angle stock. For the purpose of providing journalling means for the tilting mechanism of our invention, two pairs of transversely spaced rearwardly projecting lug brackets 25 are rigidly secured to the rear face of the upper support member 24 in oppositely spaced relationship with respect to the longitudinal center line of the truck. Also, an elongated transversely disposed cross-sectional generally rectangular lower support member 26 is rigidly but removably secured by means of the angle brackets 27 to the longitudinal frame members 4 of the truck chassis 3. For the purpose of providing journalling means for another portion of the tilting mechanism of our invention, two pairs of transversely spaced rearwardly projecting lower lug brackets 28 are rigidly secured to the rear face of the lower support member 26 in oppositely spaced relationship with respect to the longitudinal center line of the truck. Referring to FIG. 1, it is noted that the transverse spacing between the lower lug brackets 28 is somewhat less than the transverse spacing between the upper lug brackets 25, this spacing differential being necessary because of the fact that the pivot points provided by the upper and lower lug brackets 25, 28 lie in substantially the same horizontal plane when the truck box 2 is in its normal horizontal position on the truck chassis 3.

The tilting mechanism of our invention further comprises a pair of transversely spaced generally parallel first levers, represented generally by the reference numeral 29, which are pivotally connected at their forward ends 30 to the lower lug brackets 28 of the truck chassis 3, the pivotal connection therebetween being maintained by means of the pivot shaft 31. It is noted that the generally rearwardly directed ends 32 of the cooperating first levers 29 extend generally parallel to the longitudinal axis of the truck. Also, a pair of cooperating transversely spaced generally parallel second levers, represented generally by the reference numeral 33, are pivotally connected by suitable structure at their forward ends 34 to the upper lug brackets 25 of the truck box 2, the pivotal connection therebetween being maintained by means of a pivot shaft 35. By referring to FIG. 1, it is noted that the second levers 33 are formed so that the rear portions thereof are vertically aligned with the rear portions of the first levers; however, the second levers 33 are formed, as at 36, so as to provide a substantially greater transverse spacing therebetween at the forward portion thereof whereby to provide for the partial nesting of the first levers 29 within the second levers 33, as seen particularly in FIGS. 1, 2 and 7. It is further noted that the second levers 33 are disposed with their rearwardly directed ends 37 extending generally parallel to the longitudinal axis of the truck.

For the purpose of forming a pivotal connection between the pairs of first and second levers 29 and 33, and also for completing the linkage of our tilting mechanism, two pairs of transversely spaced generally parallel relatively short link elements 38 are pivotally secured between the rearward ends 32, and 37 of the first and second levers 29, 33 both of the pivotal connections therebetween being maintained by means of the pivot pins 39 and 40. It should be noted that the first levers 29 are formed at the upper portion thereof so as to define generally laterally projecting generally horizontally aligned wing portions 41. It is also noted that an elongated axle 42 is rigidly secured intermediate the second levers 33 adjacent to but spaced substantially from the rearward ends 37 thereof. A tubular shaft 43 is rotatably received on the axle 42, and is formed to define the laterally extending flange portion 44.

For the purpose of causing relative lifting movements between the first and second levers 29, 33 of our invention, a fluid pressure operated motor 45 is interposed therebetween. The motor 45 conventionally comprises a cylinder 47 which is pivotally secured by means of a pivot pin 46 to the wing portions 41 of the first levers 29 in generally transversely intermediately spaced relationship therebetween. The plunger rod 48 of the motor 45 is pivotally connected intermediate the second levers 33 in generally transversely intermediately spaced relationship therebetween by means of a bifurcated bracket 49 which is rigidly secured by means of the bolt 50 to the flange portion 44 of the tubular shaft 43. It should be obvious that in order to secure proper operation of our invention, it is mandatory that the tilting mechanism be constructed so that the axes of all of the beforesaid pivotal connections are disposed in parallelism with one another. When the motor 45 is actuated in the conventional manner, the same imparts angular movement between the first and second levers 29, 33, whereby to hoist the truck box 2 about the hinge units 16 disposed at the rear portion of the truck, said hoisting being between a lower generally horizontal position (see FIGS. 2, 5 and 7) wherein the truck box 2 is in general parallelism with the chassis 3 of the truck with respect to the hinged rear portion of the truck (see FIG. 3). With reference to FIGS. 2, 5 and 7, it is noted that the first and second levers 29, 33 when in the above described lower position are disposed in general parallelism with one another and the link elements 38 are angularly disposed with respect to both thereof.

Referring to FIGS. 2, 3 and 5–7, the first levers 29 define, intermediate the wing portions 41 and the forward ends 30 thereof, generally transversely aligned recesses which open in a direction toward the second levers 33 and extend in an opposite direction beyond a line drawn between the pivot pin connection of the motor 45 to the wing portions 41 of the first levers 29 and the pivot shaft connection of the first levers 29 to the truck chassis 3. The recesses described above of the first levers 33 receive a portion of the structure, including the pivot shaft 35, which forms the pivotal connection of the forward ends 34 of the second levers 33 to the frame of the truck box 2 when the tilting mechanism is in the lower position thereof shown particularly in FIGS. 5 and 7, whereby to achieve a more desirable and closer nesting of the tilting mechanism.

It is noted that the tilting mechanism is so pivotally connected and arranged as to define when in its lower position, shown in FIGS. 2, 4, 5 and 7, a downwardly opening recess, which downwardly opening recess is shown particularly in FIG. 4 as the large space above the rotary drive shaft 6, the same extending between the transversely spaced pairs of the first and second levers 29, 33 and the connecting link elements 38 and also extending upwardly a majority of the distance from the lowermost portion of the tilting mechanism to the uppermost portion thereof when said mechanism is in the lower position thereof shown in FIGS. 2, 5 and 7 whereby to provide clearance for the upwardly and downwardly swinging movements of the rotary drive shaft 6 of the truck. This feature of this invention will be appreciated by referring to FIG. 4, wherein it will be noted that upon the bouncing of the rear wheels of the truck and the upwardly swinging movement of the rotary drive shaft 6, the same will be received within the above-described downwardly opening recess and therefore, cannot damage the tilting mechanism. This is an important feature of this invention, as well as is the above noted design of this invention which permits a closer nesting of the tilting mechanism.

Having specifically described our invention, the operative simplicity thereof is thought to be easily understandable; however, it might be further stated with respect to the pivotal action between the first and second levers 29, 33 and the link elements 38, that the initial hoisting movement between the first and second levers 29, 33 is angularly directed about the pivotal connection between the link elements 38 and the first levers 29. The said initial movement is continued until all of the pivot points of the link elements 38 and the pivot points between the first levers 29 and the truck are generally co-lineal (see FIG. 6), and the remaining final movement of the first and second levers 29, 33 between the above described lower and upper positions is angularly directed about the pivotal connection between the link elements 38 and the second levers 33. It should be noted that in order to provide means for preventing the above described initial hoisting movement from continuing beyond the above defined terminus thereof, which would result in probable structural damage to our invention, a pair of stop blocks 51 are rigidly secured, as by welding, to the opposite sides of the rearward ends 37 of the second levers 33 (see particularly FIGS. 3, 6 and 7). It is noted that the forward ends 30 of the first levers 29 are notched so as to provide abutment surfaces 52 which stop against the bottom face 53 of the lower support member 26 when our tilting mechanism is in said lower generally horizontal position whereby to prevent angular movement of said first levers beyond the above described generally horizontal position thereof.

This invention has been thoroughly tested and found to be completely satisfactory for the accomplishment of the above objects; and while we have shown a preferred embodiment thereof, we wish it to be specifically understood that the same may be modified without departure from the scope and spirit of the appended claims.

What we claim is:

1. A truck box tilting mechanism for use intermediate the chassis and the box frame of a truck of the type in which said box frame is pivotally connected adjacent the rear of the truck chassis for upward and rearward tilting thereof, said mechanism comprising a first lever pivotally connected at one of its ends to said chassis adjacent the forward portion thereof, said first lever having its other end normally directed generally parallel to the longitudinal axis of said truck, a second lever pivotally connected by suitable structure at one of its ends to said box frame adjacent the forward portion thereof, said second lever also having its other end normally directed generally parallel to the longitudinal axis of said truck, a relatively short connecting link element pivotally connected at its opposite ends between said other ends of said first and second levers, the axes of all of the beforesaid pivotal connections being parallel and extending generally transversely with respect to said truck, and a fluid pressure operated motor interposed between said first and second levers for causing relative movement thereof between a lower normal position and an upper position for hoisting said truck box from a lower generally horizontal position to an upwardly tilted position with respect to the rear portion of said truck, said motor being connected to said first lever in spaced relationship to said one end thereof, and said first lever defining a recess which opens in a direction toward said second lever and extends in the opposite direction beyond a line drawn between the connection of said motor to said first lever and the connection of said first lever to said chassis, said recess of said first lever receiving a portion of said structure forming the pivotal connection of said one end of said second lever to said box frame when said mechanism is in said lower position whereby to achieve a closer nesting of said mechanism.

2. A truck box tilting mechanism for use intermediate the chassis and the box frame of a truck of the type in which said box frame is pivotally connected adjacent the rear of the truck chassis for upward and rearward tilting thereof, a pair of generally transversely spaced and aligned first levers pivotally connected at their corresponding one ends to said chassis adjacent the forward portion thereof, said first levers having their corresponding other ends normally directed generally parallel to the longitudinal axis of said truck, a pair of generally transversely spaced and aligned second levers pivotally connected by suitable structure at their corresponding one ends to said box frame adjacent the forward portion thereof, said second levers also having their other ends normally directed generally parallel to the longitudinal axis of said truck, a pair of generally transversely spaced and aligned relatively short connecting link elements one each pivotally connected at its opposite ends between said other ends of a different adjacent pair of one of said first lever and one of said second levers, the axes of all of the beforesaid pivotal connections being parallel and extending generally transversely with respect to said truck, a fluid pressure operated motor interposed between said first pair of levers and said second pair of levers for causing relative movement thereof between a lower normal position and an upper position for hoisting said truck box from a lower generally horizontal position to an upwardly tilted position with respect to the rear portion of said truck, said motor being connected to said first pair of levers in spaced relationship to said corresponding one ends thereof, and said first levers defining generally transversely aligned recesses which open in a direction toward said second levers and extend in an opposite direction beyond a line drawn between the connection of said motor to said first pair of levers and the connection of said first pair of levers to said truck chassis, said recesses of said first pair of levers receiving a portion of said structure forming the pivotal connection of said corresponding one ends of said second pair of levers to said box frame when said mechanism is in said lower position whereby to achieve a closer nesting of said mechanism.

3. A truck box tilting mechanism for use intermediate the chassis and the box frame of a truck of the type in which said box frame is pivotally connected adjacent the rear of the truck chassis for upward and rearward tilting thereof and which truck is equipped with rotary drive shaft mounted for upwardly and downwardly swinging movements in response to the normal bouncing of the rear wheels of the truck, said mechanism comprising a first pair of generally transversely spaced and aligned levers pivotally connected at their corresponding one ends to said chassis adjacent the forward portion thereof, said pair of first levers having their other ends normally directed generally parallel to the longitudinal axis of said truck, a pair of generally transversely spaced and aligned second levers pivotally connected by suitable structure at their corresponding one ends to said box frame adjacent the forward portion thereof, said pair of second levers also having their other ends normally directed generally parallel to the longitudinal axis of said truck, a pair of generally transversely spaced and aligned relatively short connecting link elements one each pivotally connected at its opposite ends between said other ends of a different adjacent pair of one of said first levers and one of said second levers, the axes of all of the beforesaid pivotal connections being parallel and extending generally transversely with respect to said truck, a fluid pressure operated motor interposed between said first pair of levers and said second pair of levers for causing relative movement thereof between a lower normal position and an upper position for hoisting said truck box from a lower generally horizontal position to an upwardly tilted position with respect to the rear portion of said truck, said mechanism being so pivotally connected and arranged as to define when in said lower position a downwardly opening recess which extends between said transversely spaced pairs of said first and second levers and said connecting link elements and also extends upwardly a majority of the distance from the lowermost portion of said mechanism to the uppermost portion thereof when said mechanism is in said lower position whereby to provide clearance for the said upwardly and downwardly swinging movement of said rotary drive shaft of said truck.

4. A truck box tilting mechanism for use intermediate the chassis and the box frame of a truck of the type in which said box frame is pivotally connected adjacent the rear of the truck chassis for upward and rearward tilting thereof and which truck is equipped with a rotary drive shaft mounted for upwardly and downwardly swinging movements in response to the normal bouncing of the rear wheels of the truck, said mechanism comprising a pair of generally transversely spaced and aligned first levers pivotally connected at their corresponding one ends to said chassis adjacent the forward portion thereof, said pair of first levers having their other ends normally directed generally parallel to the longitduinal axis of said truck, a pair of generally transversely spaced and aligned second levers pivotally connected by suitable structure at their corresponding one ends to said box frame adjacent the forward portion thereof, said pair of second levers also having their other ends normally directed generally parallel to the longitudinal axis of said truck, a pair of generally spaced and aligned relatively short connecting link elements one each pivotally connected at its opposite ends between said other ends of a different adjacent pair of one of said first levers and one of said second levers, the axes of all of the beforesaid pivotal connections being parallel and extending generally transversely with respect to said truck, a fluid pressure operated motor interposed between said pair of first levers and said pair of second levers for causing relative movement thereof between a lower normal position and an upper position for hoisting said truck box from a lower generally horizontal position to an upwardly tilted position with respect to the rear portion of said truck, said motor being connected to said pair of first levers in spaced relationship to said corresponding one ends thereof, said pair of first levers each defining a recess which opens in a direction toward said pair of second levers and extends in the opposite direction beyond a line drawn between the connection of said motor to said pair of first levers and the connection of said pair of first levers to said chassis, said recesses of said pair of first levers receiving a portion of said structure forming the pivotal connection of said corresponding one ends of said pair of second levers to said box frame when said mechanism is in said lower position whereby to achieve a closer nesting of said mechanism, and said mechanism being so pivotally connected and arranged as to define when in said lower position a downwardly opening recess which extends between said transversely spaced pairs of said first and second levers and said connecting link elements and also extends upwardly a majority of the distance from the lowermost portion of said mechanism to the uppermost portion thereof when said mechanism is in said lower position whereby to provide clearance for the said upwardly and downwardly swinging movement of said rotary drive shaft of said truck.

References Cited in the file of this patent
UNITED STATES PATENTS

| | | |
|---|---|---|
| 2,698,199 | Godbersen | Dec. 28, 1954 |
| 2,836,460 | Lundell | May 27, 1958 |
| 2,849,255 | Pasker | Aug. 26, 1958 |

FOREIGN PATENTS

| | | |
|---|---|---|
| 821,016 | Great Britain | Sept. 30, 1959 |